United States Patent [19]

Mott

[11] Patent Number: 5,435,360
[45] Date of Patent: Jul. 25, 1995

[54] METHOD FOR POSITIONING A MACHINE ELEMENT HAVING A REFERENCE POINT RELATIVE TO A REFERENCE POINT PROVIDED AT AN ABUTMENT

[75] Inventor: Heinz Mott, Tauberbischofsheim, Germany

[73] Assignee: Michael Weinig Aktiengesellschaft, Tauberbischofsheim, Germany

[21] Appl. No.: 224,858

[22] Filed: Apr. 8, 1994

[30] Foreign Application Priority Data

Apr. 10, 1993 [DE] Germany .................. 43 11 861.5

[51] Int. Cl.⁶ .................. B27M 1/00; B26D 7/27
[52] U.S. Cl. .................. 144/356; 116/230; 83/522.15; 83/522.29; 144/2 R; 144/329; 144/134 R; 144/136 R; 409/210
[58] Field of Search ........... 144/2 R, 329, 356, 134 R, 144/136 R; 116/230, 201; 83/522.11, 522.15, 522.19, 522.29; 409/204, 210, 214

[56] References Cited

U.S. PATENT DOCUMENTS 2,134,743  11/1938  Strawn .................. 409/210
3,109,635  11/1963  Bergmann .................. 116/230
3,406,601  10/1968  Clifford .................. 83/522.29
3,684,939   8/1972  Perry .................. 409/210

FOREIGN PATENT DOCUMENTS 61871  5/1955  France .................. 409/210

Primary Examiner—W. Donald Bray
Attorney, Agent, or Firm—Robert W. Becker & Associates

[57] ABSTRACT

In a method for positioning a machine element having a first reference point the first reference point is provided at the machine element which has an operative portion. A second reference point is provided at an abutment. The machine element is moved relative to the second reference point. The machine element is coupled to a display device with first and a second display unit wherein on the first display unit a first display value for the distance between the operative portion and the second reference point is displayed and wherein on the second display unit a second display value for the distance between the first reference point and the operative portion is displayed. The first display value is a predetermined finishing distance when the second display value equals the actual distance between the first reference point and the operative portion.

16 Claims, 3 Drawing Sheets

METHOD FOR POSITIONING A MACHINE ELEMENT HAVING A REFERENCE POINT RELATIVE TO A REFERENCE POINT PROVIDED AT AN ABUTMENT

BACKGROUND OF THE INVENTION

The present invention relates to a method for positioning a machine element having a first reference point, preferably a machining tool, relative to a second reference point, preferably at an abutment or a support surface, whereby the machine element is adjusted relative to the second reference point of the abutment such that an operative part of the machine element has a predetermined distance from the first reference point of the abutment.

In machine tools it is known to position a machine element in the form of a respective machining tool relative to an abutment or to a support surface in order to be able to machine the workpiece in the required manner. For example, in woodworking machines the machining tool is adjusted relative to an abutment such that the wood after the machining step has the required width. The adjustment of the machining tool, respectively, of its spindles is difficult. When the machining tools are exchanged, it is again required to find a so-called zero position for the positioning device in the working position.

It is an object of the present invention to improve the aforementioned method such that the machine element can be adjusted in a simple manner quickly and precisely into the required position.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
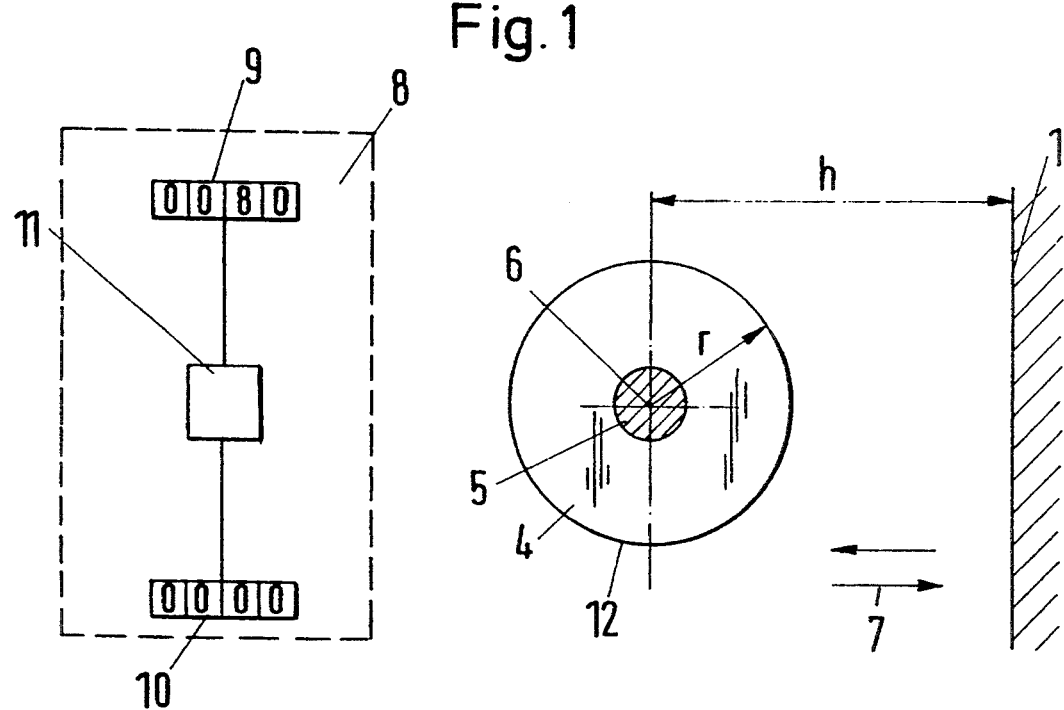
FIG. 1 shows a schematic representation of a basic position of a machining tool.

A method for positioning a machine element have a first reference point according to the present invention is primarily characterized by the following steps:

Providing a first reference point at a machine element having an operative portion;

Providing a second reference point at an abutment;

Moving the machine element relative to the second reference point;

Coupling the machine element to a display device having a first and a second display unit, wherein on the first display unit a first display value for a first distance between the operative portions and a second reference point is displayed and wherein on the second display unit a second display value for a second distance between the first reference point and the operative portion is displayed, and wherein the first display value is a predetermined finishing distance when the second display value equals the distance between the first reference point and the operative portion.

Preferably, in the step of coupling a movement of the machine element changes only one of the first and second display units.

Advantageously, the first display value displayed on the first display unit is the predetermined finishing distance.

Expediently, the second display value is said actual distance between the first reference point and the operative portion.

In a preferred embodiment of the present invention, the method further comprises the step of presetting the second display value to the actual distance between the first reference point and the operative portion. Preferably, presetting is performed with a turn knob or a decade switch.

Advantageously, the method further comprises the step of coupling the first and the second display units such that the first display value changes according to changes of the second display value.

Advantageously, the method further comprises the step of decoupling the second display unit from the first display unit for moving the machine element.

Expediently, after the step of presetting, the machine element is moved until on the first display unit the predetermined finished distance is displayed.

Preferably, the first reference point is an axis of a spindle of a machine element.

Preferably, the operative portion of the machine element is a machining circle described by a blade of the machine element upon rotation of the machine element. The distance between the first reference point and the operative portion is preferably the machining circle described by the blade.

In another embodiment of the present invention, the step of coupling comprises the step of switching selectively the first and the second display units for coupling with the machine element. Preferably for the step of switching a switch is used.

Advantageously, the first display value corresponds exactly to the predetermined finishing distance.

With the inventive method, the machine element can be exactly and simply adjusted to the correspondingly desired position with the aid of the two display units of the display device. When at the second display unit the distance of the reference point of the machine element from its operative portion is set, then at the first display unit the predetermined finishing distance of the operative portion of the machine element from the second reference point is displayed. With the aid of the positioning display device this displacement can be precisely and quickly performed. The first and the second reference points may be axes or surfaces. The operative portion, for example, can be the outer edge, a circumferential surface, an operative diameter of a tool, or the circle described by the blade(s) of a machining tool.

With the inventive method it is possible to easily position for example abutments, tools, measuring devices etc.

DESCRIPTION OF PREFERRED EMBODIMENTS

In tool machines, especially in woodworking machines such as grooving machines, the workpieces, preferably wood, are machined on their longitudinal sides with the corresponding machining tools. In order to achieve a required finished dimension for a workpiece, the machining tools must be exactly positioned before starting the machining operation. The workpieces are passed along the machining tools and rest during this operation at an abutment 1. In the drawings the scenario is represented in which a workpiece 2 is transported in the transporting direction 3 along the machining tool 4. The workpiece 2 rests on a non-represented support and is guided in the longitudinal direction along the abutment 1 in the transporting direction 3. On the side opposite the abutment 1 the workpiece 2 is machined by the machining tool 4. This can, for example, be a profiling tool that is fixedly connected to a spindle 5.

The spindle 5 may be positioned vertically or horizontally or at a slant angle on a tool machine, depending on the manner in which the workpiece 2 is to be machined. In the shown embodiment the spindle 5 extends perpendicularly to the transporting direction 3 and in the vertical direction. When the spindle 5 is positioned horizontally relative to the workpiece to be machined, the support surface serves as the abutment for the workpiece.

With the device and method described in the following, the finishing distance h can be adjusted quickly in a simple and exact manner. In the first step, the machining tool 4 is positioned in a base position. For this purpose, with the aid of exactly dimensioned measuring rings that are slipped onto the spindle 5, the base distance to the abutment 1 is adjusted. This distance value is then entered on the position display unit 9 of the display device 8. The other position display unit 10 of the display device 8 is set to zero. This initial positioning of the spindle 5 must be carried out only once. In this base position (zero position) the axis 6 of the spindle 5 has base distance to the abutment 1. In order to reach this base position, the spindle 5 must be displaced in the direction of the shown arrows 7 perpendicular to the abutment 1 such that the axis 6 of the spindle 5 has the desired distance to the abutment 1. The spindle 5 is seated on a non-represented displacing or positioning device, such as a slide, with which it can be simply displaced relative to the abutment 1. This displacing device, after positioning the spindle 5 in the base position, is connected to the display device 8 which has two position display units 9 and 10. They can be selectively connected via a switch 11 to the displacing device of the spindle 5 so that only one of the two position display units 9 or 10 displays a corresponding displacement path of the spindle 5 upon displacement.

From this initial base position the spindle 5 is adjusted to the desired finishing distance h. The position display unit 9 presently shows the finishing distance h of the spindle axis 6 from the abutment 1 which in the shown embodiment is 80 mm. Since the machining circle 12 described by the non-represented cutting blade(s) at the circumference of the machining tool 4 has a smaller distance to the abutment 1, the machining tool 4 must now be displaced relative to the abutment 1 to such an extent that with the cutting blade(s) the workpiece 2 can be machined to the desired finished dimension h. This displacement of the machining tool 4 can be performed effortlessly and in a simple manner.

The switch 11 of the display device 8 is switched so that upon displacement of the spindle 5 only the position display unit 10, and not the position display unit 9, is changed. The value which is displayed on the position display unit 9, i.e., the finishing distance h corresponding to the finished dimension, thus remains visible.

Since the spindle axis 6 has the finishing distance h to the abutment 1, the machining tool 4 must now be moved by the radius r of the machining circle 12 of the cutting blade away from the abutment 1. Since the radius r of the machining circle 12 of the machining tool 4 is known, the operator must only displace the spindle 5 to such an extent that the position display unit 10 shows the radius of the circle 12 in a direct manner. In the shown embodiment the machining circle 12 has a radius of 50 mm. As soon as the position display unit 10, which in the base position according to FIG. 1 is set to zero, shows the value 50, the machining tool 4 has reached its exact machining position. Since at the position display unit 10 the displacement value can be read effortlessly analog to the displacement that is in progress, the operator can displace the machining tool 4 without effort into the exact desired machining position by watching the display unit 10. In this so-called machining position, the machining circle 12 of the machining tool 4 has the desired finishing distance h (equal to the finished dimension h of the workpiece) to the abutment. Now it is possible to guide the workpiece 2 to be machined in the transporting direction 3 along the machining tool 4. By doing so, the workpiece 2 is machined by the cutting blades of the machining tool 4 to the desired finished dimension h, i.e., to a width of 80 mm.

Figure 2:
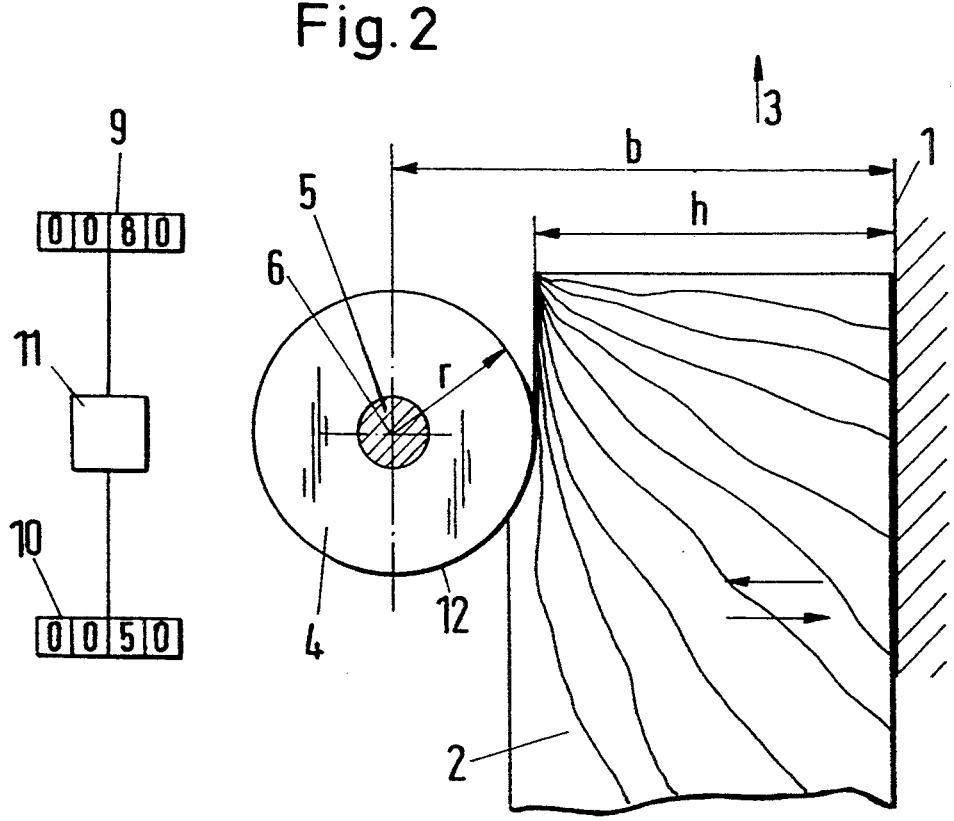
FIG. 2 shows in a representation corresponding to FIG. 1 the position of the machining tool with the correct finishing distance.

In the device according to FIG. 2 the spindle axis 6 has the distance b from the abutment 1. This distance b results from the equation $b = h + r$.

When it is desired to machine the workpiece 2 to a finished dimension h of, for example, only 60 mm, the required adjustment of the machining tool 4 can be performed simply and exactly. The switch 11 of the display device 8 is switched so that the position display unit 10 upon displacement of the machining tool 4 is not effected but only the position display unit 9. For example, when the finished dimension h no longer should be 80 mm but 60 mm, the machining tool 4, starting from the position according to FIG. 2, is displaced in the direction toward the abutment 1 until the position display unit 9 shows the value 60. Then the circle 12 of the machining tool 4 has the desired finishing distance of 60 mm to the abutment 1. Subsequently, it is immediately possible to guide the workpiece 2 along the machining tool 4 whereby the workpiece 2 is machined to the new finished dimension h of 60 mm.

With the aid of the position display unit 9 it is possible to exactly determine when the new desired finishing distance h has been reached. The other positioning display unit 10 is not adjusted during the adjustment of the spindle 5 so that the radius r of 50 mm of the circle 12 of the machining tool 4 is still displayed.

In this manner, the machining tool 4 can be exactly and simply displaced into the desired position corresponding to the desired finishing distance h.

When it is desired to achieve the finished dimension h of the workpiece with a machining tool 4 that has a different machining circle described by its cutting blades, the tool must again be correspondingly displaced. For example, when the other tool 4 has a radius of only 30 mm, then the tool must be displaced toward the abutment 1 so that the workpiece 2 to be machined will be provided with the required finished dimension h of, for example, 80 mm. The switch 11 of the display device 8 is switched such that upon the required displacement of the machining tool 4 the position display unit 10 is adjusted. At the position display unit 9 the desired finishing distance h of 80 mm is still displayed. When the spindle 5 with the new tool is now displaced from its position according to FIG. 2 in the direction toward the abutment 1, the display unit 10 will show the changing value in accordance with the displacement of the spindle 5. Since the new machining circle has a radius of 30 mm and not 50 mm, the spindle 5 must be displaced in the direction toward the abutment 1 until the position display unit 10 shows the new radius of 30 mm. This corresponds to a displacement of the spindle 5 by 20 mm. As soon as the position display unit shows the new value 30, the spindle 5 has reached its exact machining position. Now the workpiece 2 can be guided along the machining tool 4 whereby with the smaller tool size the finished dimension h of 80 mm will be provided to the workpiece.

After the machining tool with the smaller machining circle radius of 30 mm has been positioned on the spindle 5 and after switching the switch 11 to the positioning display unit 10, the spindle 5 is displaced relative to the abutment 1 until the position display unit 10 shows the value 30. Accordingly, the machining circle of the machining tool has again the required finishing distance h of the 80 mm from the abutment 1.

In the same manner, the adjustment can also be performed with machining tools having a machining circle described by the cutting blades that is greater than in the aforementioned embodiments. For example, when it is desired to have a finished dimension h of 80 mm, the distance between the machining tool 4 and the abutment 1 must be enlarged. When the new machining tool has been positioned on the spindle 5, the switch 11 is first switched to the position display 10. Then the machining tool 4 is displaced until the position display unit 10 shows the radius of the machining circle of the new machining tool. For example, when this machining circle has a radius of 70 mm, the spindle 5 is removed from the abutment 1 until the position display unit 10 shows the value 70. Then the machining circle 12 has the required distance h of 80 mm from the abutment 1. Subsequently, the workpiece 2 can be guided past the machining tool 4 to be machined to the desired dimension h.

After the machining tool with the greater machining circle has been positioned on the spindle 5 in the position according to FIG. 2, the switch 11 is switched to activate the position display unit 10. Due to the greater machining circle the spindle 5 must be positioned at a greater distance from the abutment 1. On the position display unit 10 the originally adjusted value 50 is initially shown. Since the new machining circle radius is 70 mm, the spindle 5 must therefore be displaced by 20 mm in a direction away from the abutment 1. This displacement can be easily performed. The spindle 5 is displaced until the position display unit 10 shows the new value of 70. In this position the machining circle has the required finishing distance h of 80 mm from the abutment 1. On the position display unit 9 the finishing distance h is still displayed.

In this manner, the operator can easily determine with the aid of the two position display units 9 and 10 of the display device 8 which finishing distance h has been set and what the radius of the presently inserted machining tool 4 is.

In the same manner it is also easily possible to adjust the desired finishing distance h. For example, if it is desired to reduce it from 80 mm to 60 mm, the spindle 5 must be displaced by the difference of 20 mm toward the abutment 1. Independent of the position according to FIG. 1 or the position according to FIG. 2, in both cases the switch 11 of the display device 8 is first switched to activate the positioning display unit 9. Then the spindle 5 is displaced in the direction of arrow 7 toward the abutment 1 until the position display unit 9 shows the new value 60. In this position the new finishing distance h has been exactly reached.

When the spindle 5 is in the position according to FIG. 1, the spindle 5 must again be moved away from the abutment by the radius of the machining circle. For this purpose, the switch 11 is switched to activate the position display unit 10. The spindle 5 is then displaced until on the position display unit 10 the radius of the machining circle of the respective machining tool positioned on the spindle 5 is shown.

When the spindle 5 is in the position according to FIG. 2, a further displacement of the spindle 5 is not required.

Of course, it is also possible to adjust at the same time a new finishing distance h and a new radius of the machining circle of a machining tool. For this purpose, in a first step the finishing distance h is adjusted in the aforementioned manner with the aid of the position display unit 9. Subsequently, with the aid of the position display unit 10 the respective radius of the machining circle of the tool is adjusted by displacement of the spindle 5 in the required direction. Of course, it is also possible to first adjust the radius of the machining circle and to subsequently adjust the required finishing distance.

Figure 3:
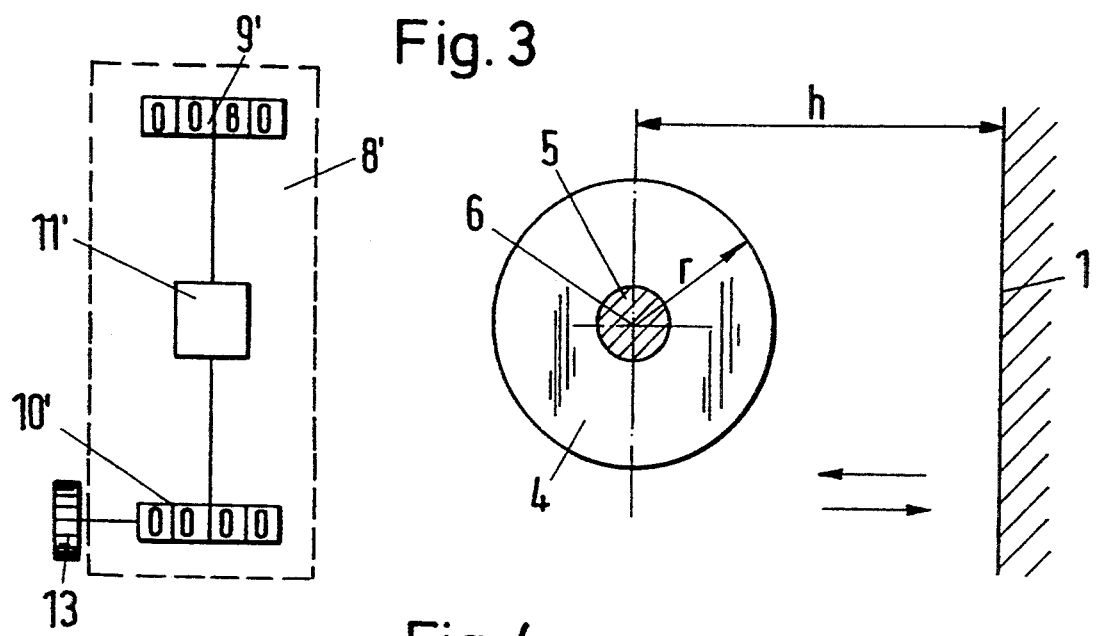
FIG. 3 shows in a representation according to FIG. 1 a second embodiment of a device for zero positioning a machining tool.
Figure 4:
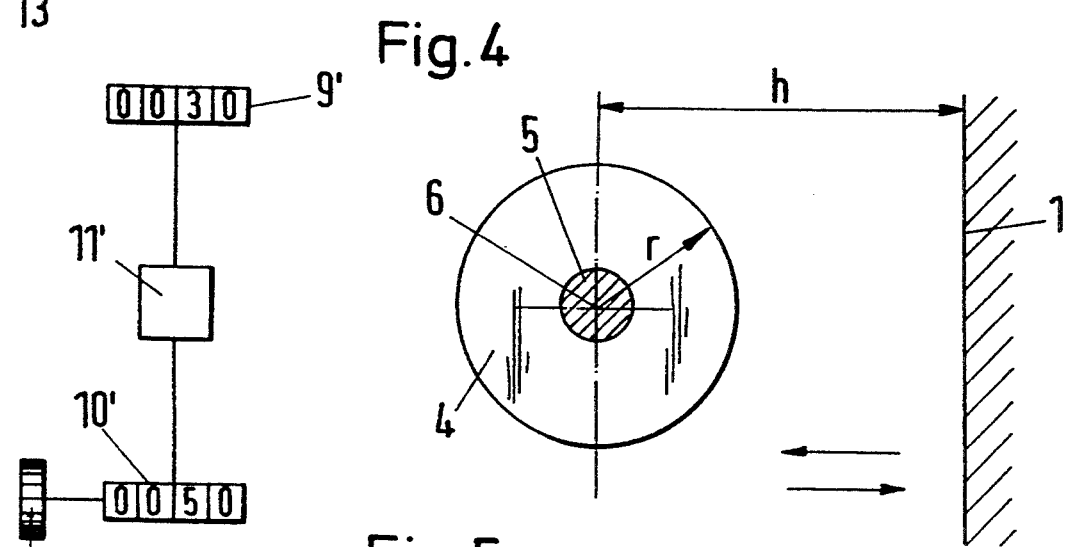
FIGS. 4 and 5 show the adjustment of the machining tool according to FIG. 2.
Figure 5:
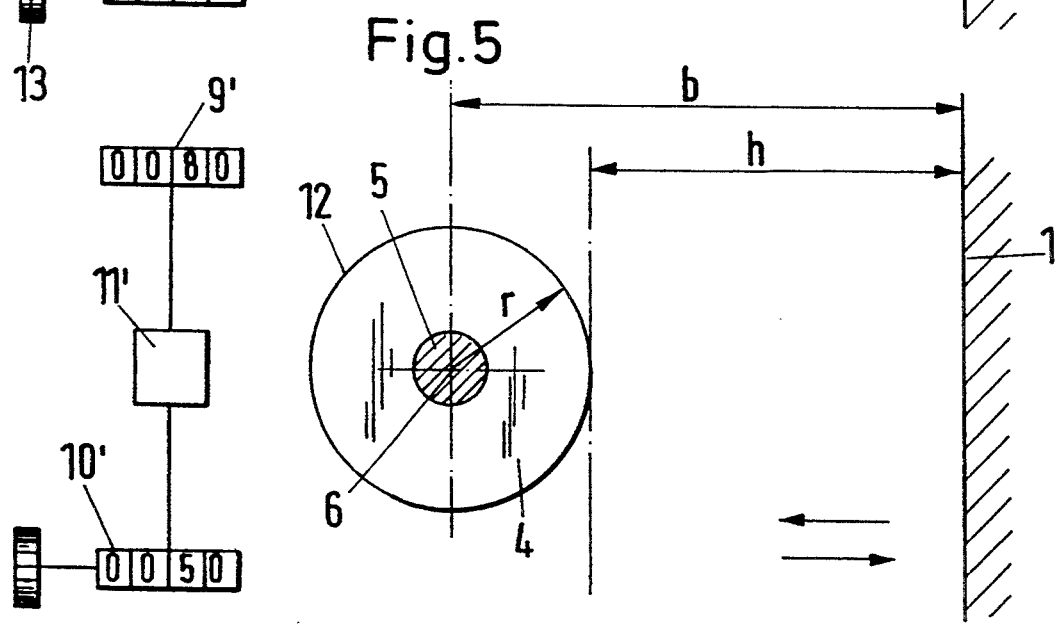

While in the embodiment according to FIGS. 1 and 2 the two position display units 9 and 10 of the display device 8 are independent of one another, in the embodiment according to FIGS. 3 to 5 the position display units 9' and 10' of the display device 8' are coupled to one another. This means that, by adjusting the display value of the position display unit 10', the value of the other position display unit 9' is correspondingly changed. Furthermore, the position display unit 9' is connected with the non-represented displacing device of the spindle 5 so that upon displacement of the spindle 5 the position display unit 9' is correspondingly adjusted. A connection to the position display unit 10' is not present so that upon displacement of the spindle 5 the position display unit 10' remains unchanged.

In the position according to FIG. 3 the axis of the spindle 5 has again the distance h from the abutment 1. This distance h is the finishing distance for the workpiece 2. In the represented embodiment this value is again 80 mm. This display value is displayed on the position display unit 9'. During displacement for setting the finishing distance, the other position display unit 10' is decoupled from the position display unit 9' with the switch 11' so that upon displacement of the spindle 5 the display value of the position display unit 10' is not changed.

After the desired finishing distance dimension h has been adjusted, the radius of the machining circle of the machining tool 4 is set at the position display unit 10' with a turn knob 13. For this setting step the switch 11' is again switched such that the two position display units 9' and 10' are coupled with one another. With the turn knob 13 the radius of the machining circle or the machining tool 4 is set on the position display unit 10' which in the shown embodiment is 50 mm. Since the two position display units 9' and 10' are coupled with one another such that the value shown on the position display unit 9' is reduced by the value set on the position display unit 10'. Accordingly, when at the position display unit 10' the value 50 has been set, the position display unit 9' shows the value 30. During this adjustment, the spindle 5 is not displaced so that its axis 6 remains positioned at the finishing distance h from the abutment 1.

After these settings have been carried out, the position display unit 10' is decoupled from the position display unit 9' and the spindle 5 is displaced relative to the abutment 1 until the position display unit 9' again shows the desired value for the finishing distance h. Due to the coupling of the displacing device of the spindle 5 with the position display unit 9', the position display unit 9' is changed according to the displacement of the spindle 5. As shown in FIG. 5, on the position display unit 9' the value 80 is displayed which corresponds to the desired finishing distance h. The value displayed on the position display unit 10' (50) remains unchanged. In this position the machining circle 12 of the machining tool 4 thus has the finishing distance h to the abutment 1.

After these adjustments of the machining tool 4, the workpiece 2 can be guided past the machining tool whereby the workpiece 2 is machined to the desired finished dimension h.

With the inventive method and display device the finishing distance h can be easily and simply changed. Based on the position shown in FIG. 3, the desired finishing distance h is adjusted with the position display unit 9'. This new distance h is again determined between the spindle axis 6 and the abutment 1. Subsequently, as described in connection with FIG. 3, the position display unit 10' is set with the turn knob 13 to the radius of the machining circle of the machining tool 4 to be used. Since during this setting the switch 11' is switched such that the two position display units 9' and 10' are coupled with one another, the setting of the radius r of the machining circle results in a reduction of the display value of the position display unit 9' by the value of the radius. Finally, after switching the switch 11' in the aforedescribed manner, the machining tool 4 is displaced relative to the abutment 1 until on the positioning display unit 9' again the finishing dimension h is displaced. Since during this displacement the position display unit 10' is decoupled, the display value on it remains unchanged.

When it is desired to work with a machining tool having a different machining circle radius, an exact adaptation of the machine can be achieved easily with the display device 8'. It is only necessary to set with the turn knob 13 in the position of the spindle 5 according to FIG. 4, on the position display unit 10' the corresponding new value of the radius r of the machining circle. As described above, in a corresponding manner the position display unit 9' changes the display value accordingly. It is then only necessary to displace the spindle with the new tool to such an extent that the position display device 9' again shows the finishing distance h.

Figure 6:
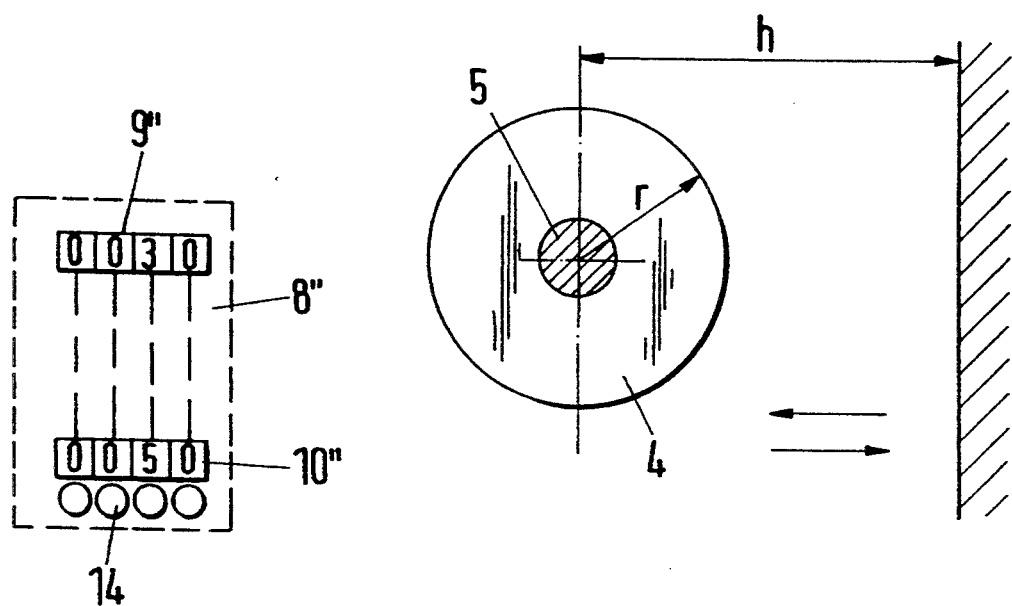
FIG. 6 shows a further embodiment of an adjusting device for the positioning of a machining tool.

In the aforedescribed manner it is also possible to simultaneously change the finishing distance h and the radius r of the machining circle for a new machining tool. With the aid of the two position display units 9', 10' a very simple but exact adjustment of the machining tool 4 is ensured. FIG. 6 shows another possibility to adjust values on the position display unit 10'' of the display device 8'' with a decade switch 14. With this decade switch 14, as disclosed supra in connection with FIGS. 3 to 5, the respective radius r of the machining circle of the machining tool 4 is set.

Furthermore, in FIG. 6 it is schematically represented that the coupling of the displacing device, respectively, of the tool holder of the spindle 5 for the machining tool 4 with the display device, respectively, the position display units, cannot only be achieved with a switch, but also with a respective constructive design of the display device 8'' and the coupling to the displacing device, respectively, the tool holder of the spindle 5 automatically. The displacement, respectively, the adjustment is carried out in the same manner as disclosed in connection with FIGS. 3 to 5. Only the switching of the switch is obsolete which, in the embodiment according to FIG. 6, is no longer needed.

In order to prevent imprecisions due to bearing or spindle play, the positioning of the spindle should always take place in the same direction, whether with the aid of the display units 9, 9', 9'' or with the aid of the display units 10, 10', 10''. For woodworking machines the vertical spindles and the lower horizontal spindles are positioned relative to the wood workpieces in a known manner while the upper horizontal spindles are to be positioned upwardly away from the wood workpieces.

The display units may be mechanical or electric displays.

The present invention is, of course, in no way restricted to the specific disclosure of the specification and drawings, but also encompasses any modifications within the scope of the appended claims.

What I claim is:

1. A method for positioning a machine element, said method comprising the steps of:
   providing a machine element having an operative portion and defining a first reference point at said machine element;
   providing an abutment as a second reference point;
   placing said machine element relative to said abutment in a selected position such that in the selected position of said machine element the distance between said first and said second reference points defines a base distance;
   coupling said machine element to a display device having a first and a second display unit and moving said machine element relative to said second reference point for positioning said machine element;
   wherein on said first display unit a first display value for a first distance between said operative portion and said second reference point is displayed and wherein on said second display unit a second display value for a second distance r between said first reference point and said operative portion is displayed; and
   wherein said first display value is a predetermined finishing distance when said second display value equals the actual distance between said first reference point and said operative portion.

2. A method according to claim 1, wherein in said step of coupling a movement of said machine element changes only one of said first and second displays.

3. A method according to claim 1, wherein said first display value displayed on said first display unit is said predetermined finishing distance.

4. A method according to claim 1, wherein said second display value displayed on said second display unit is said actual distance between said first reference point and said operative portion.

5. A method according to claim 1, further comprising the step of presetting said second display value of said second display unit to said actual distance between said first reference point and said operative portion.

6. A method according to claim 5, wherein for said step of presetting a turn knob is provided.

7. A method according to claim 5, wherein for said step of presetting a decade switch is provided.

8. A method according to claim 5, further comprising the step of coupling said first and said second display units such that said first display value changes according to changes of said second display value.

9. A method according to claim 5, further comprising the step of decoupling said second display unit from said first display unit for moving said machine element.

10. A method according to claim 5, wherein after said step of presetting said machine element is moved until on said first display unit said predetermined finishing distance is displayed.

11. A method according to claim 1, wherein said first reference point is an axis of a spindle of said machine element.

12. A method according to claim 1, wherein said operative portion of said machine element is a machining circle described by a blade of said machine element upon rotation of said machine element.

13. A method according to claim 12, wherein said distance between said first reference point and said operative portion is said machining circle described by said blade.

14. A method according to claim 1, wherein said step of coupling comprises the step of switching selectively said first and said second display units for coupling with said machine element.

15. A method according to claim 14, wherein in said step of switching a switch is used.

16. A method according to claim 1, wherein said first display value corresponds exactly to said predetermined finishing distance.

* * * * *